US009776723B2

(12) United States Patent
Gow et al.

(10) Patent No.: US 9,776,723 B2
(45) Date of Patent: Oct. 3, 2017

(54) TABLE ARRANGEMENT (71) Applicant: Zodiac Seats UK Limited, Cwmbran (GB)

(72) Inventors: Robert Gow, Chepstow (GB); Paul Morgan, Nantyglo (GB)

(73) Assignee: Zodiac Seats UK Limited, Cwmbran (GB)

( * ) Notice: Subject to any disclaimer, the term of this patent is extended or adjusted under 35 U.S.C. 154(b) by 50 days.

(21) Appl. No.: 14/679,095

(22) Filed: Apr. 6, 2015

(65) Prior Publication Data

US 2015/0284088 A1 Oct. 8, 2015

(30) Foreign Application Priority Data

Apr. 7, 2014 (GB) .................................. 1406235.0

(51) Int. Cl.
*B64D 11/06* (2006.01)
*A47B 5/04* (2006.01)
(Continued)

(52) U.S. Cl.
CPC .......... *B64D 11/0605* (2014.12); *A47B 5/006* (2013.01); *A47B 5/04* (2013.01); *A47B 13/081* (2013.01); *B64D 11/0638* (2014.12)

(58) Field of Classification Search
CPC . B64D 11/0605; B64D 11/0638; A47B 5/006; A47B 13/081
(Continued)

(56) References Cited

U.S. PATENT DOCUMENTS 2,554,685 A * 5/1951 St. Denis ............... B60N 3/002
108/33
3,773,381 A * 11/1973 Brennan ................... A47C 7/70
108/45
(Continued)

FOREIGN PATENT DOCUMENTS

CN 203016215 U 6/2013
DE 3523393 A1 1/1987
(Continued)

OTHER PUBLICATIONS

EP Patent Application No. 15162662.9, Extended Search Report dated Aug. 12, 2015, 7 pgs.
(Continued)

*Primary Examiner* — David R Dunn
(74) *Attorney, Agent, or Firm* — Kilpatrick Townsend & Stockton LLP; Dean W. Russell (57) ABSTRACT The present invention provides a table arrangement 100 for use in an aircraft seat module, the table arrangement comprising a first table element suitable for being movably mounted to a mounting structure of the aircraft seat module, the first table element being provided with a first table surface, a second table element provided with a second table surface substantially parallel to the first table surface, wherein the second table element is mounted to the first table element, such that the second table element is moveable from a first position with respect to the first table element to a second position with respect to the first table element, the second position being transformed from the first position within the plane of the second table element. The present invention also provides an aircraft seat module, an aircraft and a method of deploying a table arrangement.

25 Claims, 4 Drawing Sheets (51) Int. Cl.
*A47B 13/08* (2006.01)
*A47B 5/00* (2006.01)

(58) Field of Classification Search
USPC .... 297/163, 146, 144, 147, 173; 108/41, 44, 108/94
See application file for complete search history.

(56) References Cited

U.S. PATENT DOCUMENTS

| | | | | |
|---|---|---|---|---|
| 5,322,021 A * | 6/1994 | Jackson | ............... | B60N 3/002 108/44 |
| 5,547,247 A * | 8/1996 | Dixon | ............... | A47C 7/70 297/145 |
| 6,135,549 A * | 10/2000 | Demick | ............... | B60N 3/001 108/44 |
| 6,220,660 B1 * | 4/2001 | Bedro | ............... | B60N 2/468 108/44 |
| 6,547,323 B1 * | 4/2003 | Aitken | ............... | B60N 3/002 108/44 |
| 6,761,398 B2 * | 7/2004 | Bentley | ............... | B60N 2/22 297/135 |
| 6,793,281 B2 * | 9/2004 | Duerr | ............... | B60N 2/4606 297/147 |
| 7,311,354 B2 * | 12/2007 | Giasson | ............... | B64D 11/06 297/145 |
| 7,500,716 B2 * | 3/2009 | Guerin | ............... | B60N 3/004 297/146 |
| 7,607,726 B2 * | 10/2009 | Orlo | ............... | B60N 3/004 248/421 |
| 8,702,163 B2 * | 4/2014 | Westerink | ............... | B60N 3/004 297/146 |
| 2009/0223417 A1 | 9/2009 | Muirhead | | |
| 2012/0167807 A1 * | 7/2012 | Legeay | ............... | B60N 3/002 108/41 |
| 2013/0093220 A1 * | 4/2013 | Pajic | ............... | A47C 7/70 297/163 |
| 2013/0093221 A1 * | 4/2013 | Ligonniere | ............... | B64D 11/06 297/173 |
| 2015/0061327 A1 * | 3/2015 | Millan | ............... | B60N 3/004 297/163 |
| 2015/0284090 A1 * | 10/2015 | Stephens | ............... | B64D 11/0638 297/163 |

FOREIGN PATENT DOCUMENTS

| | | | | |
|---|---|---|---|---|
| DE | 4125783 A1 | 2/1993 | | |
| FR | WO 2015155682 A2 * | 10/2015 | ......... | B64D 11/0638 |
| WO | 9832632 A1 | 7/1998 | | |
| WO | 2011089558 A1 | 7/2011 | | |

OTHER PUBLICATIONS

Great Britain Patent Application No. 1406235.0, Search Report issued Oct. 17, 2014, 3 pages.

* cited by examiner

TABLE ARRANGEMENT

CROSS-REFERENCE TO RELATED APPLICATION

This application claims priority to Great Britain Application No. 1406235.0, filed Apr. 7, 2014, entitled "A Table Arrangement," which is incorporated herein by reference in its entirety.

BACKGROUND OF THE INVENTION

The present invention concerns a table arrangement. More particularly, but not exclusively, this invention concerns a table arrangement for use in an aircraft seat module, the table arrangement comprising a first table element suitable for being movably mounted to a mounting structure of the aircraft seat module, the first table element being provided with a first table surface, and a second table element provided with a second table surface substantially parallel to the first table surface.

The invention also concerns an aircraft seat module, and aircraft and a method of deploying a table arrangement of an aircraft seat module.

There are various forms of table arrangement for an aircraft seat module.

For example, in economy seating, one table arrangement folds down from the back of a seat in front about a substantially horizontal axis to provide a table surface in front of the passenger. In another (bi-fold) arrangement, the table may be made up of two table elements and where a first table element folds down from a substantially horizontal axis on the seat in front and then a second table element folds out (along an axis extending across the table—i.e. extending across the passenger) towards the passenger from the first table element. In another (book fold) arrangement, a second table element may folds out (along an axis extending along the table—i.e. extending away from the passenger) to be next to the first table element.

In business class seating and first class seating, the table arrangements may deploy from a console of an aircraft seat module, rather than from a seat in front. These table arrangements may deploy from the console by swivelling or rotating.

In many business and first class seating arrangements, there are console structures (and other structures) from which a table arrangement could be mounted that are not "square on" to the passenger in the seat. This if often due to the fact that the seats are arranged at an angle to the axis of the fuselage of the aircraft. However, it is not readily possibly to provide a "square on" table to the passenger by mounting the table arrangement to such a non-"square on" structure. Hence, the options of where to mount the table arrangement are limited.

The present invention seeks to mitigate the above-mentioned problems. Alternatively or additionally, the present invention seeks to provide an improved table arrangement.

SUMMARY OF THE INVENTION

The present invention provides, according to a first aspect, a table arrangement for use in an aircraft seat module, the table arrangement comprising a first table element suitable for being movably mounted to a mounting structure of the aircraft seat module, the first table element being provided with a first table surface, a second table element provided with a second table surface substantially parallel to the first table surface, wherein the second table element is mounted to the first table element, such that the second table element is moveable from a first position with respect to the first table element to a second position with respect to the first table element, the second position being transformed from the first position within the plane of the second table element.

In other words, the transformation involves the second table element moving in a plane substantially parallel to the first table element surface.

Such a table arrangement allows a table surface to be provided away from a structure of an aircraft seat module to which the table arrangement is mounted (if the second table element is translated with respect to the first table element).

Such a table arrangement also allows the table arrangement to be mounted onto a non-"square-on" structure of an aircraft seat module, whilst still providing a "square-on" table surface to a passenger sat in the seat of the aircraft seat module, once the table arrangement is deployed (if the second table element is rotated with respect to the first table element). In addition, the table arrangement can be stowed effectively. For example, if instead the table arrangement simply had an angled fold (at a suitable angle) between the first and second elements, this would provide a "square-on" table surface to the passenger but would result in a complicated table shape (when the first and second elements are folded in) to have to stow.

Preferably, in the first position, the first and second table surfaces are substantially stacked with respect to each other. This gives an especially effective stowage shape of the table arrangement.

Preferably, the second table element is rotatably mounted to the first table element about an axis substantially perpendicular to the first and second table surfaces, such that the second table element is moveable from the first position with respect to the first table element to the second position with respect to the first table element, the second position being rotationally transformed from the first position.

More preferably, the first and second table surfaces overlap for at least 90% of the area of the smallest of the first and second surfaces. In other words, if the first surface is 900 cm$^2$ and the second surface is 600 cm$^2$, the area of the smallest of the first and second surfaces would be 600 cm$^2$. Hence, to overlap by 90% would mean that only up to 60 cm$^2$ of the second surface could not be overlapping with the first surface.

Preferably, the total table area provided by the two surfaces is at least 150% of the area of the largest of the first and second surfaces.

Preferably, the first and second table elements (or surfaces) are substantially the same size and shape.

Preferably, the second table element is mounted on a support arm, the support arm being rotatably mounted to the first table element.

Preferably, the substantially perpendicular rotation axis is located at a distal portion of the first table element away from mounting to the mounting structure. This allows a large table area to be provided by the first table element, extending towards a passenger.

Preferably, the substantially perpendicular rotation axis is located at a distal portion of the second table element away from mounting to the mounting structure. This allows for the second table element to get closer to, for use by, a passenger.

Preferably, the second table element is restricted from rotationally transforming any further in a first direction from the first position and restricted from rotationally transforming any further in a second opposite direction than the second position and wherein the second table element has been rotationally transformed from the first position to the second position by an angle of between 10 and 45 degrees. This allows a "square-on" table to be provided to a passenger sat an angle between 10 and 45 degrees to the mounting structure.

More preferably, the second table element has been rotationally transformed from the first position to the second position by an angle of between 20 and 35 degrees. This allows a "square-on" table to be provided to a passenger sat an angle between 20 and 35 degrees to the mounting structure.

Preferably, the second table element is translationally mounted to the first table element, such that the second table element is movable from a third position with respect to the first table element to a fourth position with respect to the first table element, the fourth position being translationally transformed from the third position. This allows a larger total table surface to be provided, to reduce the overlap between the first and second table surfaces.

More preferably, the third position is the same as the second position. This means that the second table element can rotate with respect to the first table element and then translate from that rotated position. In particular, the first and second table elements may be connected such that the second table element must be rotated to the second position in order for the second table element to then be translated from the second position.

Preferably, the second table element is slidably mounted to the first table element, such that the second table element is slidable in a direction substantially parallel to the first and second table surfaces from the third position to the fourth position.

Preferably, the first and second table elements overlap in the fourth position. This means that the total table surface is a single shape, rather than being split into two shapes.

Preferably, the second table element is translationally mounted to the support arm.

Preferably, the support arm is housed in a recess in the second table element when the second table element is in the third position. This allows the support arm to be hidden when the second table element is in the untranslated (third) position. It also allows the bottom level of the second table element to be adjacent to the top level of the first table element, without a supporting arm having to significantly separate them which would increase the depth of the deployed table arrangement and create an unwanted gap between the two table elements.

More preferably, the recess extends substantially parallel to the second table surface.

Preferably, the second table element is restricted from translationally transforming any further in a third direction from the third position and restricted from translationally transforming any further in a fourth opposite direction than the fourth position and wherein the second table element has been translationally transformed from the third position to the fourth position through a distance of between 10 and 30 centimeters.

More preferably, the second table element has been translationally transformed from the third position to the fourth position through a distance of between 15 and 20 centimeters.

Preferably, wherein the second table surface, and more preferably also the first table surface, is substantially rectangular. This provides a suitable table area for a passenger.

Preferably, the second table element is provided with a finger hold to facilitate its transformation with respect to the first table element.

More preferably, the finger hold is located at a distal portion of the second table element away from the substantially perpendicular rotation axis. This provides for an easier transformation as the moment about the substantially perpendicular rotation axis is large for a small force by the passenger.

The present invention provides, according to a second aspect, an aircraft seat module comprising a seat, a table arrangement as described above, and a mounting structure, wherein the table arrangement is movably mounted to the mounting structure, such that it can be moved from a stowed position with respect to the mounting structure to a deployed position with respect to the mounting structure.

Preferably, the table arrangement is rotatably mounted on the mounting structure, preferably about a substantially horizontal axis.

Preferably, when the table arrangement is in the deployed position with respect to the mounting structure, the second table element is in the first position with respect to the first table element.

More preferably, wherein the first and second table surfaces are substantially rectangular and wherein the long sides of the rectangles, in the fourth position, extend substantially away from the seat of the aircraft seat module and wherein the short sides of the rectangles, in the fourth position, extend substantially across the width of the seat of the aircraft seat module.

Preferably, the mounting structure is mounted to a rear portion of an aircraft seat module in front.

The present invention provides, according to a third aspect, an aircraft comprising a table arrangement or an aircraft seat module as described above.

Preferably, seats of the aircraft are provided at an angle to the axis of the fuselage of the aircraft.

The present invention provides, according to a fourth aspect, a method of deploying a table arrangement of an aircraft seat module, the method comprising the steps of moving the table arrangement with respect to a mounting structure of the aircraft seat module, from a stowed position to a deployed position, and rotationally transforming a second table element of the table arrangement with respect to a first table element of the table arrangement, about an axis substantially perpendicular to a first table surface of the first table element and a second table surface of the second table element, from a first position to a second position.

Preferably, the method further comprises the step of translationally transforming the second table element with respect to the first table element, from a third position to a fourth position.

A latch used to secure the table arrangement in the stowed position with respect to the mounting structure is described and claimed in UK patent application entitled "A Securable Furniture Arrangement" with agent's reference "P022767 GB ECT", having the same filing date as the present application. The contents of that application are fully incorporated herein by reference. The claims of the present application may incorporate any of the features disclosed in that patent application.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
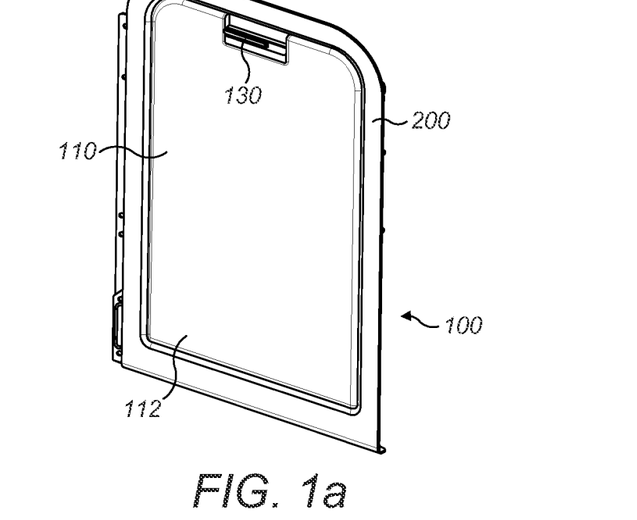
FIG. 1a shows a perspective view of a table arrangement according to a first embodiment of the invention, in a stowed position in a mounting frame.
Figure 1B:
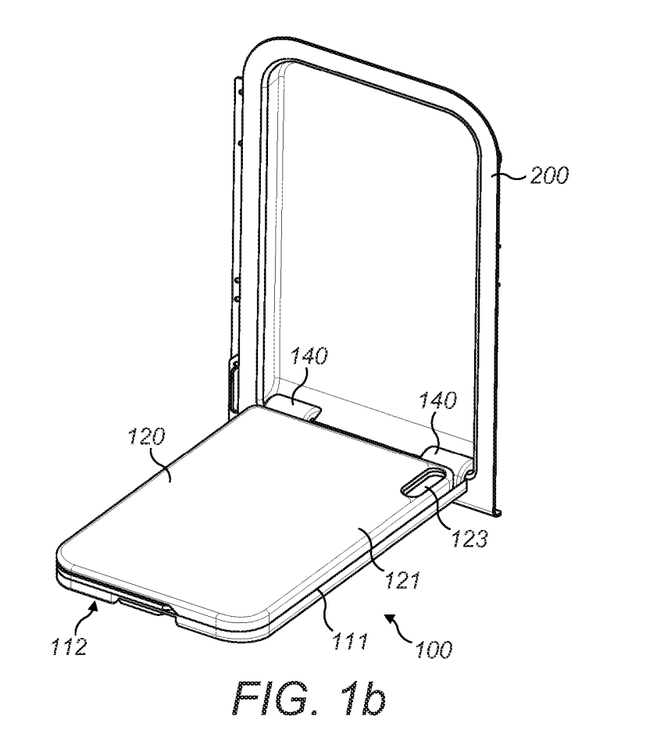
FIG. 1b shows a perspective view of the table arrangement of FIG. 1a, in a pulled down position from the mounting frame.
Figure 1C:
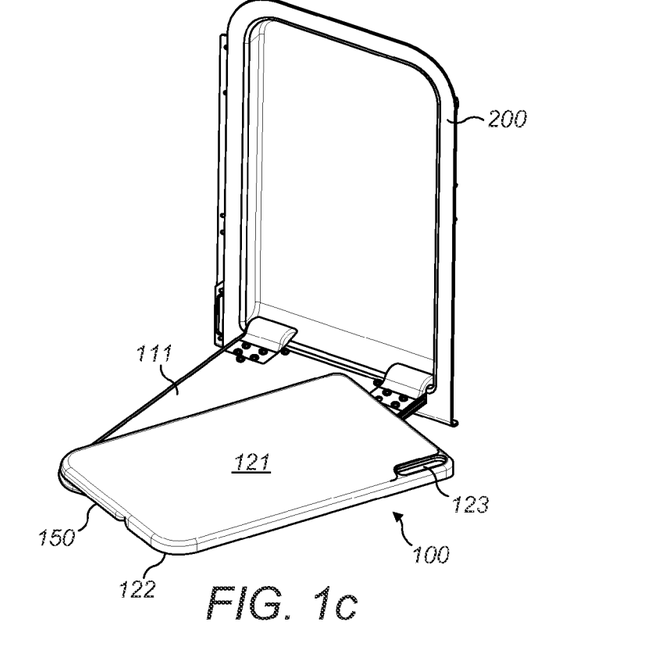
FIG. 1c shows a perspective view of the table arrangement of FIGS. 1a and 1b, in a pulled down and rotated position.
Figure 1D:
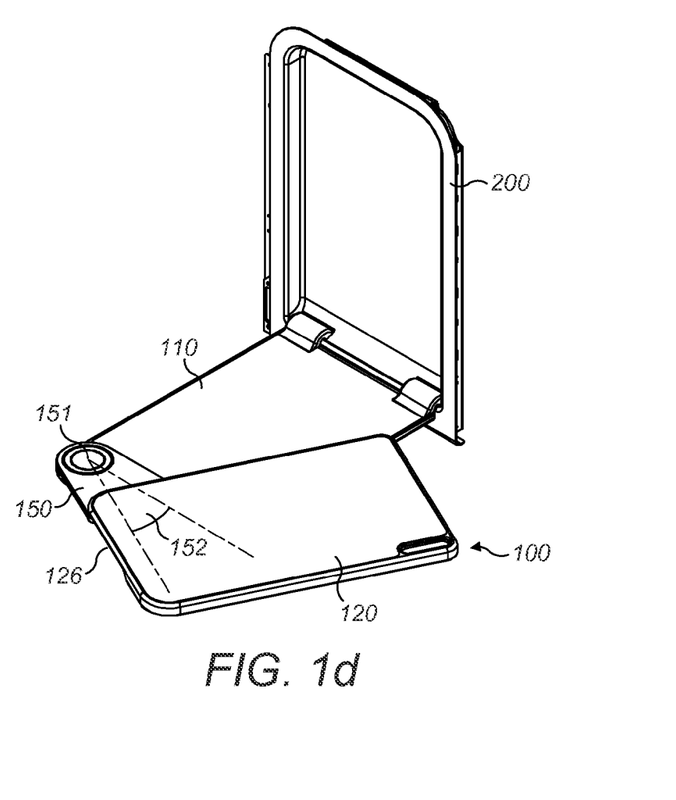
FIG. 1d shows a perspective view of the table arrangement of FIGS. 1a, 1b and 1c, in a pulled down, rotated and translated (fully deployed) position.

FIG. 1a shows a perspective view of a table arrangement 100 according to a first embodiment of the invention, in a stowed position in a mounting frame 200. FIG. 1b shows a perspective view of the table arrangement 100, in a pulled down position from the mounting frame 200. FIG. 1c shows a perspective view of the table arrangement 100, in a pulled down and rotated position and FIG. 1d shows a perspective view of the table arrangement 100, in a pulled down, rotated and translated (fully deployed) position.

The table arrangement comprises a first table element 110, which is substantially rectangular in shape, with two rounded corners on an adjacent short side. The arrangement 100 also comprises a second table element 120, which has the approximate same shape and size as the first table element 110. The second table element 120 is actually slightly smaller than the first table element 110 in order to avoid a clash with hinges 140 (described later) during rotation between the stowed and pulled down positions.

When in the stowed position of FIG. 1a, the first and second table elements are both secured vertically (with the long sides of the rectangular being vertical) in the mounting frame 200. A bottom surface 112 of the first table element can be seen facing outwards from the mounting frame 200. To deploy the table arrangement 100 to the pulled down position of FIG. 1b, a latch release lever 130 located at the upper end of the bottom surface 112 of the first table element 110 can be depressed to release a latch holding the table arrangement in place in the mounting frame 200.

The first table element 110 is pivotally mounted (by hinges 140) to a lower edge of the mounting frame 200 along a horizontal pivot axis. When the latch release lever 130 is depressed and the table arrangement 100 pulled down, the first table element 110 (and, as a result, second table element 120) rotates to be horizontal so that it extends away from the mounting frame 200.

In this position (FIG. 1b), the second table element 120 can be seen. It lies directly on top (stacked) on the first table element 110, with its upper surface 121 facing upwards. In a top right corner of the second table element 120 is a finger indent slot 123 for a passenger to pull on the second table element 120. If this is done and the finger indent slot 123 is pulled clockwise, the second table element 120 rotates by an angle 152 of 27 degrees to a rotated position (see FIG. 1c).

If the finger indent slot 123 is then pulled in a direction substantially parallel to the short sides of the rectangle of the second table element 120, the second table element translates by a distance of 12 cm to a translated position (see FIG. 1d).

In this position, it can be seen that the second table element 120 is mounted on a support arm 150. This support arm is mounted to the bottom left corner of the first table element 110 by a vertical pivot hinge 151. This hinge 151 allows the second table element 120 to rotate with respect to the first table element 110 (described above).

Figure 2:
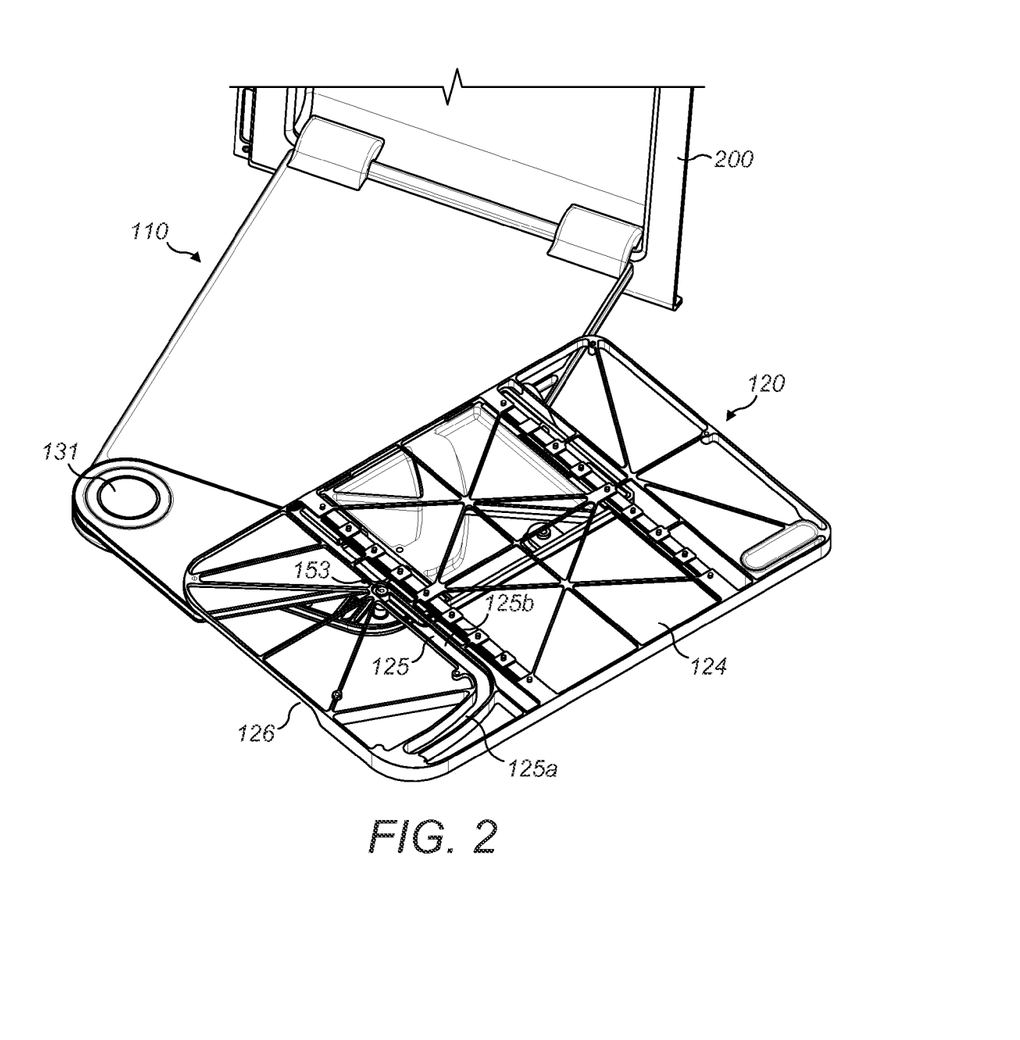
FIG. 2 shows a perspective partial cut-away view of the table arrangement of FIGS. 1a, 1b, 1c and 1d.

FIG. 2 shows a perspective partial cut-away view of the table arrangement of FIGS. 1a, 1b, 1c and 1d. Here, the support arm 150 and the second table element 120 can be seen more clearly. Here, it is also shown that the upper surface 111 of the first table element 110 is provided with a protruding cam follower 113. The cam follower 113 is mounted in a cam track 125 located in the second table element 120. The cam track 125 comprises a straight portion 125b and a curved portion 125a such that the second table element must be fully rotated from the pulled down position to the rotated position (with the cam follower travelling in the curved portion 125a of the cam track) before it can be then translated to the translated position (the cam follower then travelling in the straight portion 125b of the cam track).

The second table element 120 also has a recess 126, shaped to accommodate the support arm 150 when the second table element is not translated from the first table element 110. The support arm 150 fits in this recess 126 so that a bottom surface of the support arm 150 is flush with a bottom surface 122 of the second table element 120.

The internal structure 124 of the second table element is also shown.

Figure 3:
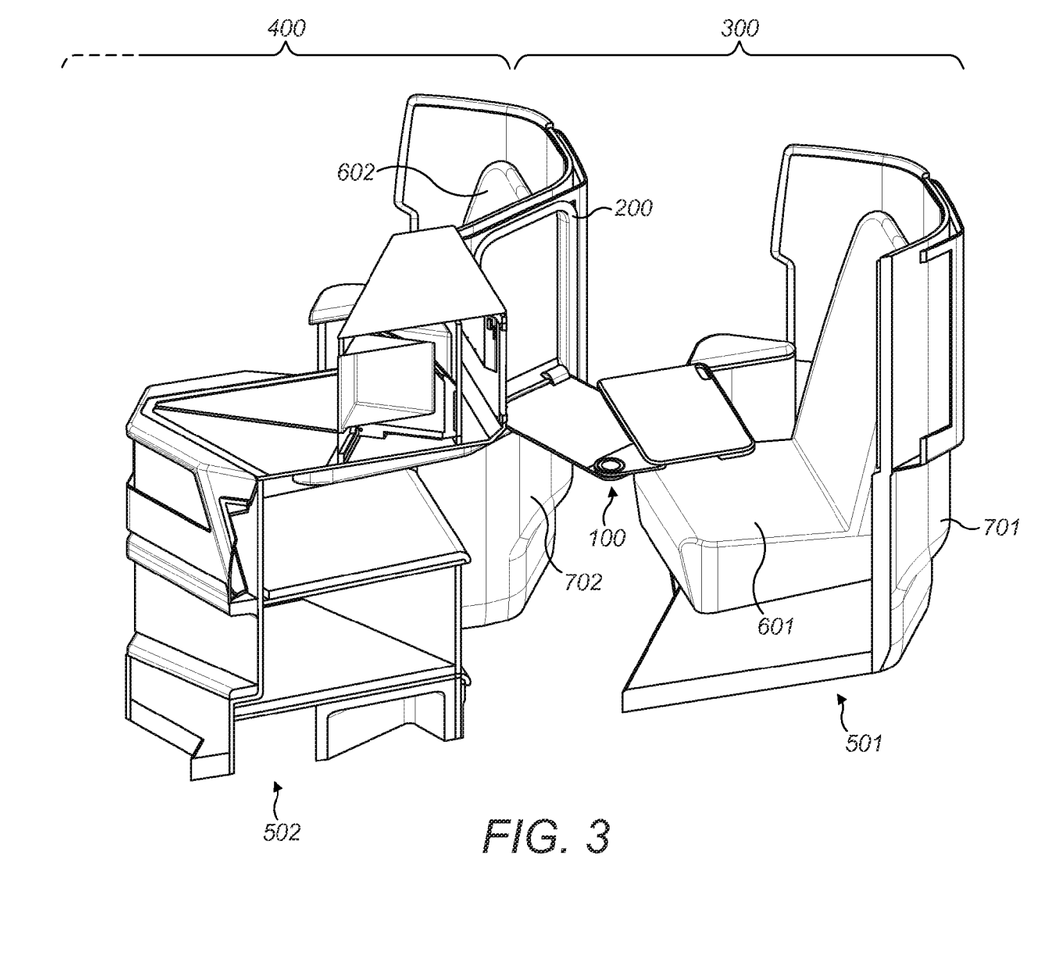
FIG. 3 shows a perspective view part of an aircraft according to a second embodiment of the invention.

FIG. 3 shows a perspective view part of an aircraft according to a second embodiment of the invention. Here, two aircraft seat modules are shown; a rear aircraft seat module 300 and a front aircraft seat module 400. The modules are made up of aircraft seat structures, as follows. A rear aircraft seat structure 501 comprises a console 701 with a seat 601 mounted in it. A front aircraft seat structure 502 comprises a console 702 with a seat 602 mounted in it. The rear aircraft seat module 300 is made up of the seat 601 and surrounding parts of console 701, and the rear of console 702, onto which the mounting frame 200 (and table arrangement 100) is mounted. The front aircraft seat module 400 is made up of the seat 602 and surrounding parts of console 702, and the rear of a console ahead of it (not shown), onto which a second mounting frame 200 (and table arrangement 100) would be mounted.

In FIG. 3, it can be seen that the fully deployed table arrangement (as in FIG. 1d and FIG. 2) is "square on" to the seat 601. In other words, the table arrangement 100 is such that the table arrangement can be mounted on part of a console 702 that is at an angle to the seat 601, yet still provided a "square on" table for a passenger in seat 601.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The table elements may not be rectangular and could be any suitable shape for providing a table surface for a passenger.

Any angle of rotation of the second table element could be provided for. Ideally, the angle would allow the table to provide a "square on" table for use by a passenger in seat 601.

Similarly, any translation distance of the second table element could be provided for. Ideally, the distance would allow the table to be adjacent the seat 601 for use by a passenger in eat 601.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A table arrangement for use in an aircraft seat module, the table arrangement comprising:
   a first table element suitable for being movably mounted to a mounting structure of the aircraft seat module, the first table element being provided with a first table surface, and
   a second table element provided with a second table surface substantially parallel to the first table surface,
   wherein the second table element is rotatably mounted to the first table element about an axis substantially perpendicular to the first and second table surfaces, such that the second table element is moveable from a first position with respect to the first table element to a second position with respect to the first table element, the second position being rotationally transformed from the first position, the transformation being within a plane of the second table element,
   wherein the second table element is restricted from rotationally transforming any further in a first direction from the first position and restricted from rotationally transforming any further in a second opposite direction than the second position, and
   wherein movement of the second table element from the first position to the second position is through an angle of between 10 and 45 degrees.

2. A table arrangement as claimed in claim 1, wherein, in the first position, the first and second table surfaces are substantially stacked with respect to each other.

3. A table arrangement as claimed in claim 1, wherein the second table element is mounted on a support arm, the support arm being rotatably mounted to the first table element.

4. A table arrangement as claimed in claim 3, wherein the second table element is translationally mounted to the support arm.

5. A table arrangement as claimed in claim 4, wherein the support arm is housed in a recess in the second table element when the second table element is in the second position.

6. A table arrangement as claimed in claim 5, wherein the recess extends substantially parallel to the second table surface.

7. A table arrangement as claimed in claim 1, wherein the substantially perpendicular rotation axis is located at a distal portion of the first table element away from the mounting to the mounting structure.

8. A table arrangement as claimed in claim 1, wherein the substantially perpendicular rotation axis is located at a distal portion of the second table element away from the mounting to the mounting structure.

9. A table arrangement as claimed in claim 1, wherein the second table element is translationally mounted to the first table element, such that the second table element is movable from a third position with respect to the first table element to a fourth position with respect to the first table element, the fourth position being a position that is a translation transformation from the third position.

10. A table arrangement as claimed in claim 9, wherein the third position of the second table element is the same as the second position of the second table element.

11. A table arrangement as claimed in claim 9, wherein the second table element is slidably mounted to the first table element, such that the second table element is slidable in a direction substantially parallel to the first and second table surfaces from the third position to the fourth position.

12. A table arrangement as claimed in claim 9, wherein the first and second table elements overlap in the fourth position.

13. A table arrangement as claimed in claim 9, wherein the second table element is restricted from translationally transforming any further in a third direction from the third position and restricted from translationally transforming any further in a fourth opposite direction than the fourth position and wherein movement of the second table element is defined by a translation transformation through a distance of between 10 and 30 centimeters.

14. A table arrangement as claimed in claim 13, wherein the distance is between 15 and 20 centimeters.

15. A table arrangement as claimed in claim 14, wherein the first and second table surfaces are substantially rectangular.

16. A table arrangement as claimed in claim 15, wherein the second table element is provided with a finger hold to facilitate its transformation with respect to the first table element.

17. A table arrangement as claimed in claim 16, wherein the finger hold is located at a distal portion of the second table element away from the substantially perpendicular rotation axis.

18. A table arrangement as claimed in claim 9, further comprising a support arm rotatably mounted to the first table element, and wherein the second table element (a) is translationally mounted to the support arm and (b) has a recess in which the support arm is housed when the second table element is in the third position.

19. An aircraft seat module comprising:
   a seat,
   a mounting structure, and
   a table arrangement configured to be moved from a stowed position with respect to the mounting structure to a deployed position with respect to the mounting structure and comprising:
      a first table element suitable for being movably mounted to the mounting structure, the first table element being provided with a first table surface,
      a second table element provided with a second table surface substantially parallel to the first table surface,
      wherein the second table element is rotatably mounted to the first table element about an axis substantially perpendicular to the first and second table surfaces, such that the second table element is moveable from a first position with respect to the first table element to a second position with respect to the first table element, the second position being rotationally transformed from the first position, the transformation being within a plane of the second table element, wherein the second table element is restricted from rotationally transforming any further in a first direction from the first position and restricted from rotationally transforming any further in a second opposite direction than the second position, and wherein movement of the second table element from the first position to the second position is through an angle of between 10 and 45 degrees.

20. An aircraft seat module as claimed in claim 19, wherein the table arrangement is rotatably mounted on the mounting structure.

21. An aircraft seat module as claimed in claim 19, wherein, when the table arrangement is in the deployed position with respect to the mounting structure, the second table element is in the first position with respect to the first table element.

22. An aircraft seat module as claimed in claim 19, wherein the mounting structure is mounted to a rear portion of a second aircraft seat module, in front of the aircraft seat module.

23. An aircraft comprising:
a seat,
a mounting structure, and
a table arrangement configured to be moved from a stowed position with respect to the mounting structure to a deployed position with respect to the mounting structure and comprising:
a first table element suitable for being movably mounted to the mounting structure, the first table element being provided with a first table surface,
a second table element provided with a second table surface substantially parallel to the first table surface,
wherein the second table element is rotatably mounted to the first table element about an axis substantially perpendicular to the first and second table surfaces, such that the second table element is moveable from a first position with respect to the first table element to a second position with respect to the first table element, the second position being rotationally transformed from the first position, the transformation being within a plane of the second table element, wherein the second table element is restricted from rotationally transforming any further in a first direction from the first position and restricted from rotationally transforming any further in a second opposite direction than the second position, and wherein movement of the second table element from the first position to the second position is through an angle of between 10 and 45 degrees.

24. A method of deploying a table arrangement of an aircraft seat module, the table arrangement comprising (a) a first table element suitable for being movably mounted to a mounting structure of the aircraft seat module, the first table element being provided with a first table surface, and (b) a second table element provided with a second table surface substantially parallel to the first table surface, the second table element being rotatably mounted to the first table element about an axis substantially perpendicular to the first and second table surface, the method comprising the steps of:

moving the table arrangement with respect to the mounting structure of the aircraft seat module, from a stowed position to a deployed position, and rotationally transforming the second table element of the table arrangement with respect to the first table element of the table arrangement through an angle of between 10 and 45 degrees, about the axis and within a plane of the second table element, from a first position to a second position, the rotational transformation being restricted any further in a first direction from the first position and any further in a second opposite direction than the second position.

25. A method of deploying a table arrangement as claimed in claim 24, wherein the method further comprises the step of translationally transforming the second table element with respect to the first table element, from a third position to a fourth position.

* * * * *